(12) United States Patent
Hirobe et al.

(10) Patent No.: US 6,560,553 B1
(45) Date of Patent: May 6, 2003

(54) METHOD OF ESTIMATING AN ECCENTRIC POSITION OF AN ACCELERATION SENSOR AND ACCELERATION GENERATING APPARATUS WITH AN ECCENTRICITY ADJUSTER

(75) Inventors: Yoshiaki Hirobe, Saitama (JP); Takashi Kunimi, Saitama (JP)

(73) Assignees: Akebono Brake Industry Co., Ltd., Tokyo (JP); Akebono Research and Development Centre Ltd., Saitama (JP)

( * ) Notice: Subject to any disclaimer, the term of this patent is extended or adjusted under 35 U.S.C. 154(b) by 158 days.

(21) Appl. No.: 09/714,530

(22) Filed: Nov. 17, 2000

(30) Foreign Application Priority Data

Nov. 19, 1999 (JP) .......................................... 11-329044

(51) Int. Cl.[7] ............................................... G01P 15/00
(52) U.S. Cl. ......................... 702/94; 702/95; 73/514.15
(58) Field of Search .............................. 702/94, 95, 88, 702/90, 150–151; 73/1.37, 1.38, 514.02, 514.04, 514.15, 514.16, 514.32, 514.35

(56) References Cited

U.S. PATENT DOCUMENTS 5,353,642 A * 10/1994 Hasegawa et al. ............ 73/1.38
5,831,164 A * 11/1998 Reddi et al. ............. 73/514.01
6,408,675 B1 * 6/2002 Kunimi ....................... 73/1.37

FOREIGN PATENT DOCUMENTS

JP       7-110342        4/1995
JP       2000-206143        7/2000

* cited by examiner

Primary Examiner—Bryan Bui
(74) Attorney, Agent, or Firm—Morgan, Lewis & Bockius LLP (57) ABSTRACT

A method of estimating an eccentric position of an acceleration sensor for a double turntable-type acceleration generating apparatus includes the steps of mounting the acceleration sensor on an auxiliary rotating body; rotating the auxiliary rotating body at a constant frequency with a main rotating body held at a standstill; measuring an output signal from the acceleration sensor; determining an amount of eccentricity in an X-axis direction of the acceleration sensor from the frequency of the auxiliary rotating body and the output signal; and determining an amount of eccentricity in a Y-axis direction by using tangential acceleration generated by the rotation of the auxiliary rotating body in a state in which the amount of eccentricity in the X-direction is set to substantially zero.

6 Claims, 9 Drawing Sheets

METHOD OF ESTIMATING AN ECCENTRIC POSITION OF AN ACCELERATION SENSOR AND ACCELERATION GENERATING APPARATUS WITH AN ECCENTRICITY ADJUSTER

BACKGROUND OF THE INVENTION

1. Field of the Invention

The present invention relates to a method of estimating an eccentric position and an acceleration generating apparatus having a function of adjusting eccentricity. More specifically, the method according to the present invention is for an acceleration sensor mounted as an object to be inspected on an auxiliary turntable (auxiliary rotating body) of a double turntable-type acceleration generating apparatus, which is suitable for investigating the characteristics of the acceleration sensor for detecting acceleration. The method is suitable for estimating an amount of eccentricity, by which the acceleration sensor is off-centered with respect to the rotational center of the auxiliary turntable. Further, the apparatus according to the present invention relates to a double turntable-type acceleration generating apparatus and a single turntable-type acceleration generating apparatus, both having an eccentricity adjusting function

2. Description of the Related Art

Conventionally, it has been the practice to detect by an acceleration sensor the acceleration of an object which moves three-dimensionally such as a robot, an airplane, or the like, and an object which moves in a two-dimensional plane such as an automobile. The movement of the object or various equipment mounted on the object is controlled in accordance with respective purposes on the basis of the result of detection. To realize this control, acceleration sensors of various forms are presently used, but in a case where an acceleration sensor is incorporated into a controlling device, it is necessary to ascertain in advance what characteristics the acceleration sensor which is used actually have.

To investigate the various characteristics of the acceleration sensor, the investigation is presently conducted by using a vibration tester, but the following problems are encountered with this method.

(1) The vibration tester investigates the acceleration characteristics by applying reciprocating acceleration to a specimen mounted on a testing table. However, there are cases where the testing table slightly tilts during the reciprocating motion (vertical motion) of the testing table in the light of the mechanism of the tester, and it is difficult to reciprocate the testing table accurately. Namely, components other than the component in the reciprocating direction act in the acceleration sensor during the test, and the acceleration is measured by including an interference output, so that this method is not sufficient to precisely investigate the various characteristics of the sensor.

(2) As for the aforementioned vibration tester, since the test is carried out by actually imparting acceleration to the acceleration sensor by using a vibration generating apparatus, the tester inevitably becomes large in size. Moreover, since the dynamic acceleration of the vibration must be actually imparted to the acceleration sensor, the performance test of the acceleration sensor is troublesome.

Against such a backdrop, to overcome the above-described problems, the present inventors proposed a novel centrifugal acceleration tester (double turntable-type acceleration generating apparatus) which is capable of improving the characteristic accuracy remarkably (refer to JP-A-7-110342). In this double turntable-type acceleration generating apparatus, an acceleration in a predetermined direction with a predetermined force (i.e., an acceleration of a DC component) is imparted by a centrifugal force to the acceleration sensor mounted on an auxiliary turntable of the apparatus, and the various characteristics of the acceleration sensor can be precisely tested.

However, in the case where the characteristics of the acceleration sensor are investigated by using the above-described turntable-type acceleration generating apparatus, it is, in practice, virtually impossible to align the rotational center of the auxiliary turntable and the center of gravity of the sensitivity axis of the acceleration sensor serving as an object to be inspected. For this reason, an output error occurs in the output signal due to the eccentricity of the rotational center of the auxiliary turntable with respect to the center of gravity of the sensitivity axis of the acceleration sensor, and there has been a need to correct this error by various methods.

Namely, when the characteristics of a commercially available acceleration are tested, it is extremely important to ascertain the center of gravity of the sensitivity axis of the acceleration sensor. At present, however, no method is available for accurately ascertaining the center of gravity of the sensitivity axis. For this reason, an error caused by the deviation of the center of gravity of the sensitivity axis is inevitably found in the output value of the characteristic of the acceleration sensor, so that it has been impossible to know accurate acceleration sensor characteristics.

For this reason, in the double turntable-type acceleration generating apparatus, a serious error occurs if the center of gravity of the sensitivity axis of the acceleration sensor cannot be set at the rotational center of the auxiliary turntable. Although the error due to eccentricity and a DC component due to the eccentricity error can be separated, it becomes impossible to measure the intrinsic low-frequency response of the acceleration sensor in the state in which the DC component is superposed. For this reason, it is necessary to align the center of gravity of the sensitivity axis of the acceleration sensor and the rotational center of the auxiliary turntable or make adjustment such that the error level is contained below measurement accuracy. For this purpose, it is, first of all, prerequisite to be able to estimate the amount of eccentricity.

Here, referring to the drawings, a brief description will be given of the effect of eccentricity on an acceleration sensor element. FIG. 9(a) shows the operation of a cantilever within an acceleration detecting unit in a case where there is no eccentricity, while FIG. 9(b) shows the operation of the cantilever within the acceleration detecting unit in a case where there is eccentricity.

Generally, the indeterminacy of the position of the center of gravity of the sensitivity axis of the acceleration sensor is 0.0008 [m] or, thereabouts at maximum, and constitutes an element of error even in the test of the single turntable system. Further, in the double turntable system, secondary centripetal acceleration occurring due to the centrifugal force of the rotation of the auxiliary turntable and acceleration due to Coriolis force are added. There is a possibility that in a case where there is an eccentricity of 0.0008 [m], acceleration of as much as 1 G or more at maximum occurs only by the rotation of the auxiliary turntable. In addition, the error due to the effect of this eccentricity produces a result in which a DC component is superposed on the low-frequency signal output of the acceleration sensor, and it is possible to separate the two components.

Figure 9:
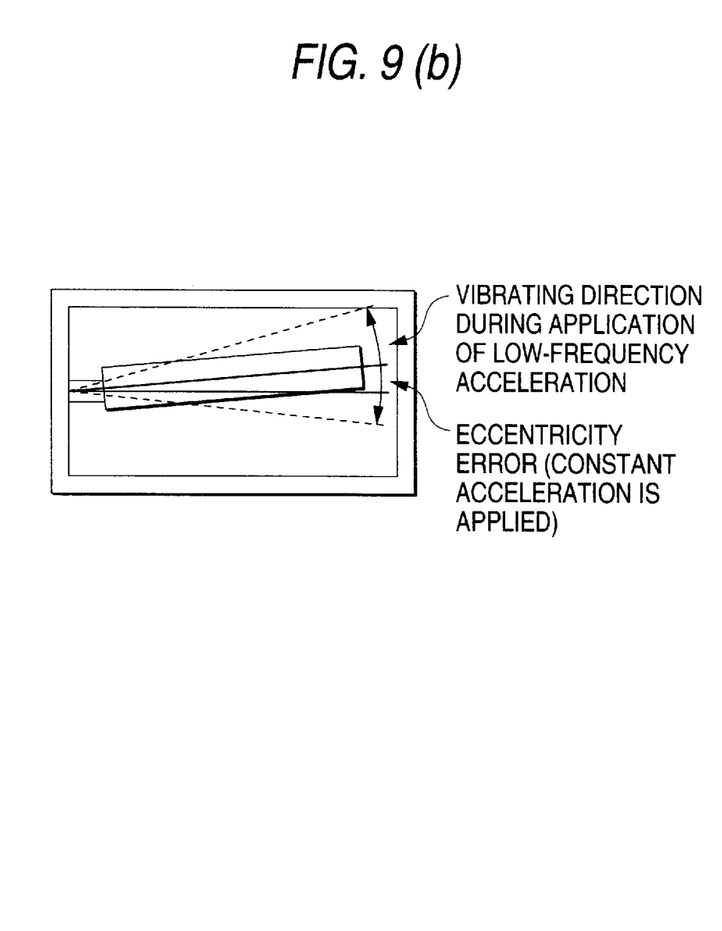
FIG. 9(a) is a diagram illustrating the operation of a cantilever within an acceleration detecting unit in a case where there is no eccentricity.
FIG. 9(b) is a diagram illustrating the operation of the cantilever within the acceleration detecting unit in a case where there is eccentricity.

However, if the low-frequency acceleration is applied in the state in which a constant G is applied to the acceleration sensor, it is conceivable that the element vibrates on only the positive electrode side or the negative electrode side of the acceleration sensor, and it is conceivable that the measurement is possibly effected under a condition totally different from that of the intrinsic low-frequency response, as shown in FIG. 9 referred to above. In addition, depending on the acceleration sensor, it is conceivable that the sensitivity range is exceeded due to the superposition of the DC component.

As countermeasures against such eccentricity error, it is possible to cite the following:

(a) The eccentricity error output can be reduced to zero by rotating the main and auxiliary turntables by the same number of revolutions and in the opposite directions.

(b) The amount of eccentricity is reduced to zero or to a level at which no effect is exerted on the measurement accuracy level.

(c) The range of occurrence of frequency is made small. For example, to 1 [Hz] or less.

However, in the countermeasure based on (a), there is only one point at which the frequency can be generated with respect to each arbitrary acceleration, and even if the radius of rotation is made variable, the degree of freedom cannot be made very large. In addition, in the countermeasure based on (c), the value of the double turntable-type low-frequency acceleration generating apparatus is reduced.

From the above, as a countermeasure which is considered to be most effective at present, the technique of (b) in which the amount of eccentricity is made to approach zero is considered to be the best.

SUMMARY OF THE INVENTION

Accordingly, the present invention has been devised on the basis of the above-described knowledge, and its object is to provide a double turntable-type low-frequency acceleration generating apparatus which is capable of estimating the amount of deviation between the center of gravity of the sensitivity axis of the acceleration sensor and the rotational center of the auxiliary turntable and of adjusting the amount of eccentricity, thereby making it possible to align the center of gravity of the sensitivity axis of the acceleration sensor and the rotational center of the auxiliary turntable. In addition, this method of estimating the amount of eccentricity is naturally applicable to a single turntable-type acceleration generating apparatus as well.

In accordance with the present invention, even if the acceleration sensor is disposed with its center of gravity of the sensitivity axis off-centered at any position, the amount of its eccentricity can be easily estimated. In addition, by adjusting the position of the center of gravity of the sensitivity axis of the acceleration sensor on the basis of the estimated amount of eccentricity, it is possible to align the center of gravity of the sensitivity axis of the acceleration sensor and the rotational center of the auxiliary turntable, so that the acceleration sensor characteristics can be always ascertained accurately.

According to the present invention, the above object is accomplished by a method of estimating an eccentric position of an acceleration sensor in a double turntable-type acceleration generating apparatus including a main rotating body which is rotated by a first servo motor and an auxiliary rotating body which is mounted at an appropriate position on an outer periphery of the main rotating body in such a manner as to be rotatable by a second servo motor and on which an acceleration sensor can be mounted thereon, the method comprising the steps of: mounting the acceleration sensor, which is an object to be inspected, on the auxiliary rotating body; rotating the auxiliary rotating body at a constant frequency in a state that the main rotating body is stopped; measuring an output signal from the acceleration sensor in the state that the main rotating body is stopped; determining an amount of eccentricity in an X-axis direction of the acceleration sensor from the frequency of the auxiliary rotating body and the output signal at that time; and determining an amount of eccentricity in a Y-axis direction by using tangential acceleration generated by the rotation of the auxiliary rotating body in a state in which the amount of eccentricity in the X-axis direction is set to zero.

Further, according to the present invention, the above object is accomplished by a double turntable-type acceleration generating apparatus including a main rotating body which is rotated by a first servo motor and an auxiliary rotating body which is mounted at an appropriate position on an outer periphery of the main rotating body in such a manner as to be rotatable by a second servo motor and on which an acceleration sensor can be mounted thereon, wherein an eccentricity adjuster including an X-Y table movable in an X-direction and a Y-direction and mounted on the auxiliary rotating body.

It is also preferable that in the above double turntable-type acceleration generating apparatus, the X-Y table which is movable in the X-direction and the Y-direction is arranged to be adjusted on the basis of outputs from: a first calculator for calculating an amount of eccentricity in X-axis direction of the acceleration sensor by measuring an output signal from the acceleration sensor during rotation of the auxiliary rotating body at a constant frequency with the main rotating body held at a standstill, in which the amount of eccentricity in X-axis direction is determined from the frequency of the auxiliary rotating body and the output signal at that time; and a second calculator for calculating an amount of eccentricity in Y-axis direction of the acceleration sensor by using tangential acceleration generated by the rotation of the auxiliary rotating body in a state in which the amount of eccentricity in the X-direction is set to zero.

Further, according to the present invention, the above object is also accomplished by a single turntable-type acceleration generating apparatus including a rotating body which is rotated by a servo motor, an acceleration sensor being mountable on the rotating body; and an eccentricity adjuster including an X-Y table movable in an X-direction and a Y-direction and mounted on the rotating body.

DETAILED DESCRIPTION OF THE PREFERRED EMBODIMENTS

Referring now to the drawings, a description will be given of an embodiment of the present invention.

Figure 1:
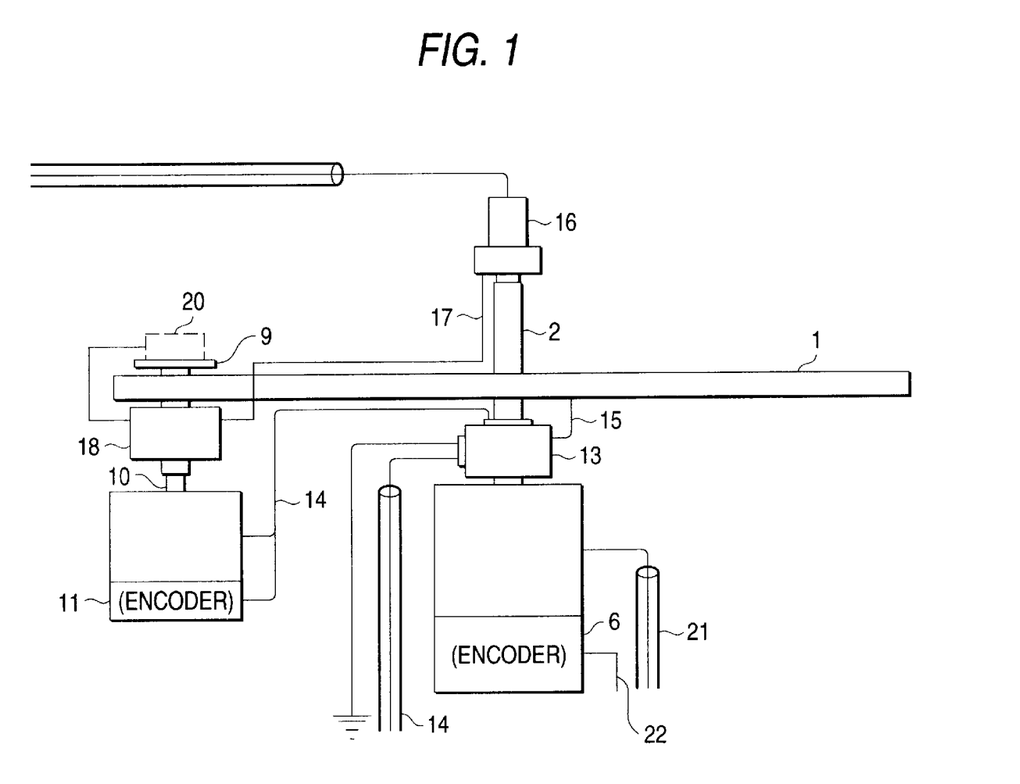
FIG. 1 is a schematic side elevational view of a turntable-type acceleration generating apparatus in accordance with an embodiment of the present invention.
Figure 2:
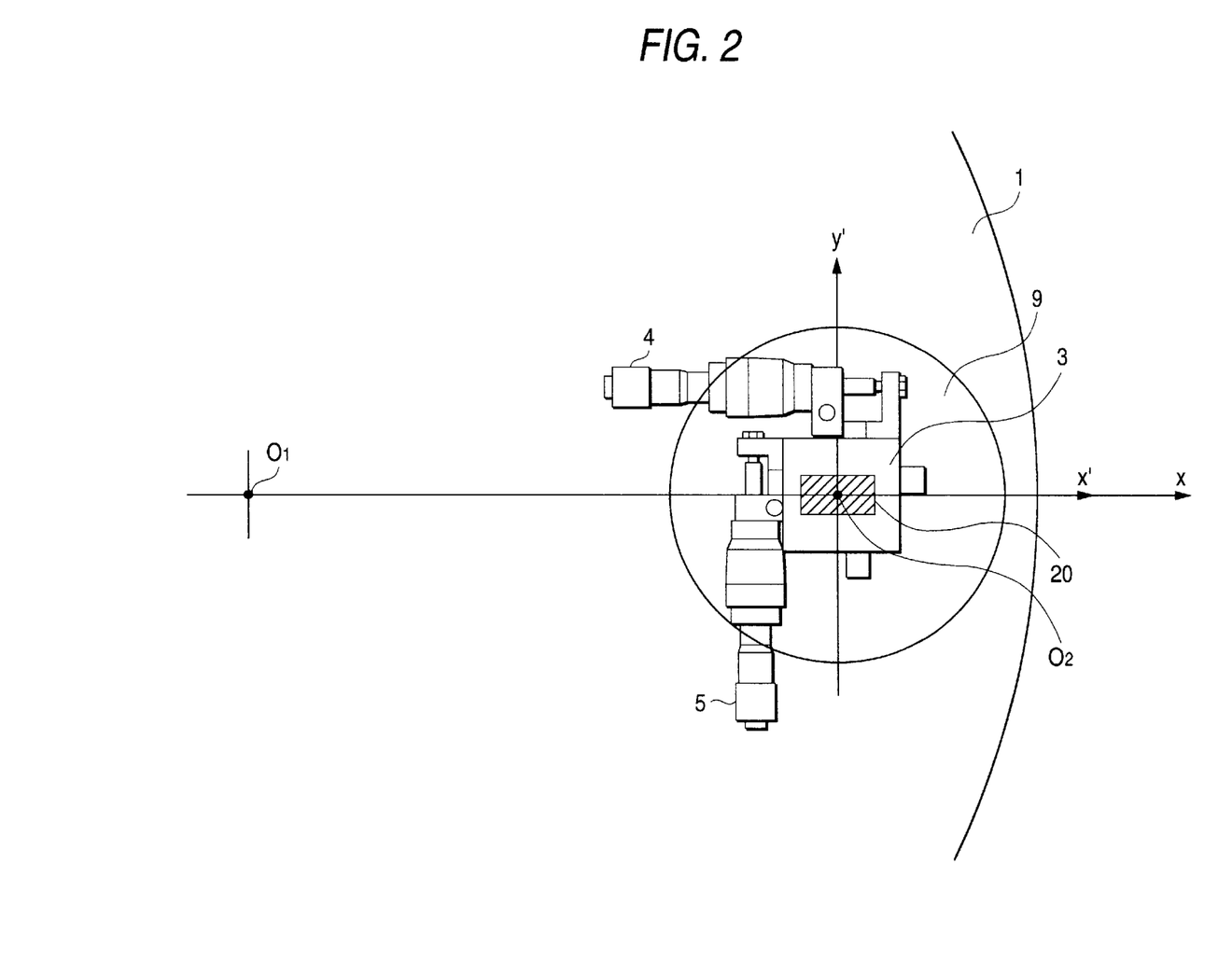
FIG. 2 is a plan view of an auxiliary turntable of the apparatus.

FIG. 1 is a schematic side elevational view of a turntable-type acceleration generating apparatus serving as a rotating-type acceleration generating apparatus in accordance with the present invention. FIG. 2 is a plan view of an auxiliary turntable of the apparatus.

Referring to the drawings, a description will be given below of the configuration of the turntable-type acceleration generating apparatus used in the present invention. Reference numeral 1 denotes a main turntable which is a rotating body having an appropriate diameter and is formed of a nonmagnetic material such as aluminum or copper. A rotating shaft 2 is fixed to the main turntable 1, upper and lower ends of the rotating shaft 2 of the main turntable 1 are pivotally supported by bearings which are provided on turntable supporting arms (not shown), such that the main turntable 1 is able to rotate about the rotating shaft 2.

A servo motor 6 (hereafter referred to as a first servo motor 6) for driving the main turntable and having an encoder is attached to the rotating shaft 2, and is connected to an controlling device (not shown) through a power line 21 and a control signal line 22. For this reason, when the first servo motor 6 is driven, the main turntable 1 is also rotated relative to the turntable supporting arms.

An auxiliary turntable 9 serving as a rotating body which also serves as a sensor mounting base is pivotally supported at an appropriate position on an outer peripheral side of the main turntable 1. An output shaft of a servo motor 11 (hereafter referred to as a second servo motor 11) for driving the auxiliary turntable is coupled to a rotating shaft 10 of this auxiliary turntable 9, so that when the second servo motor 11 is driven, the auxiliary turntable 9 is rotated. Numeral 18 denotes a slip ring.

As shown in FIG. 2, an X-Y table 3 (a known one is used as the table) is mounted on the auxiliary turntable 9, and the X-Y table 3 is provided with an X-axis adjusting micrometer having a head 4 and a Y-axis adjusting micrometer having a head 5, so that the movement of an acceleration sensor 20 serving as an object to be inspected and mounted on the X-Y table 3 can be adjusted in the directions of the X- and Y-axes. Namely, in a case where the center of gravity of the sensitivity axis of the acceleration sensor 20 is offset from the rotational center of the auxiliary turntable, the center of gravity of the sensitivity axis of the acceleration sensor 20 mounted on the table can be aligned with the rotational center of the auxiliary turntable by operating the X-axis adjusting micrometer head 4 and the Y-axis adjusting micrometer head 5. The X-axis adjusting micrometer head 4 and the Y-axis adjusting micrometer head 5 are operated in accordance with signals from a controller (not shown) in correspondence with the amount of movement determined by a method of estimating the amount of eccentricity, which will be described later. It should be noted that the X-axis adjusting micrometer head 4 and the Y-axis adjusting micrometer head 5 are also capable of being manually operated.

To establish a rotational balance, a balancer (not shown) commensurate with the weight of the auxiliary turntable 9 and the second servo motor 11 is provided at a predetermined position on the main turntable 1, so that the main turntable 1 can be rotated smoothly. In addition, a balancer is also attached, as required, to the auxiliary turntable to realize smooth rotation.

A first slip ring 13 is disposed on the rotating shaft 2 of the main turntable 1 at an appropriate position lower than the main turntable 1, and a power and control signal line 14 for supplying electric power to the second servo motor 11 as well as a grounding conductor for the main turntable 1 are connected to this first slip ring 13.

In addition, a second slip ring 16 is disposed on the rotating shaft 2 at an appropriate position higher than the main turntable 1, and one end of a signal fetching line 17 for fetching a signal from the acceleration sensor 20 mounted on the auxiliary turntable 9 is connected to the second slip ring 16. The other end of the signal fetching line 17 is connected to a third slip ring 18 provided on the rotating shaft of the auxiliary turntable 9.

For this reason, the arrangement provided is such that the signal from the acceleration sensor on the auxiliary turntable 9 which is rotating can be measured by a measurement instrument outside the apparatus through the third and second slip rings 18 and 16 even when both the auxiliary turntable 9 and the main turntable 1 are rotating.

In the turntable-type acceleration generating apparatus constructed as described above, the test on the characteristics of the acceleration sensor is performed as follows.

1. The acceleration sensor 20 is fixed to the auxiliary turntable 9 on the main turntable 1.
2. While the main turntable 1 is being rotated by the first servo motor 6 to generate a centrifugal force, and the auxiliary turntable 9 is being concurrently rotated by the second servo motor 11, an acceleration in a predetermined direction and with a predetermined force is generated in the acceleration sensor 20, and the characteristics of the acceleration sensor are measured.
3. Electric power is supplied to the first servo motor 6 from the controlling device through the power supply and control signal lines, while electric power is supplied and a control signal and the like are supplied to the second servo motor 11 from the controlling device (not shown) through the first slip ring 13. It should be noted that the main turntable 1 is grounded through the first slip ring 13.
4. A signal from the acceleration sensor 20 is transmitted to a measuring instrument through the third slip ring 18 provided on the rotating shaft of the auxiliary turntable 9, the signal fetching line 17, and the second slip ring 16 which are disposed on the upper side of the main turntable 1, and predetermined data are collected.

In the measurement of the characteristics, it is difficult to align the center of gravity of the sensitivity axis of the acceleration sensor and the rotational center of the auxiliary turntable as described above, with the result that the low-frequency component showing the intrinsic characteristic of the acceleration sensor and the noise component occurring due to the eccentricity of the center of gravity of the sensitivity axis are superposed in the output components of the acceleration sensor, and it is therefore difficult to investigate the precise characteristics of the acceleration sensor.

Accordingly, as a result of promoting a study on the method of estimating the eccentric position which makes it possible to cause the amount of deviation between the center of gravity of the sensitivity axis of the acceleration sensor mounted on the auxiliary turntable and the rotational center of the auxiliary turntable to approach zero, the present inventors established the method of estimating an amount of eccentricity of an acceleration sensor which will be described below, and successfully developed an apparatus for adjusting an amount of the eccentricity.

Figure 3:
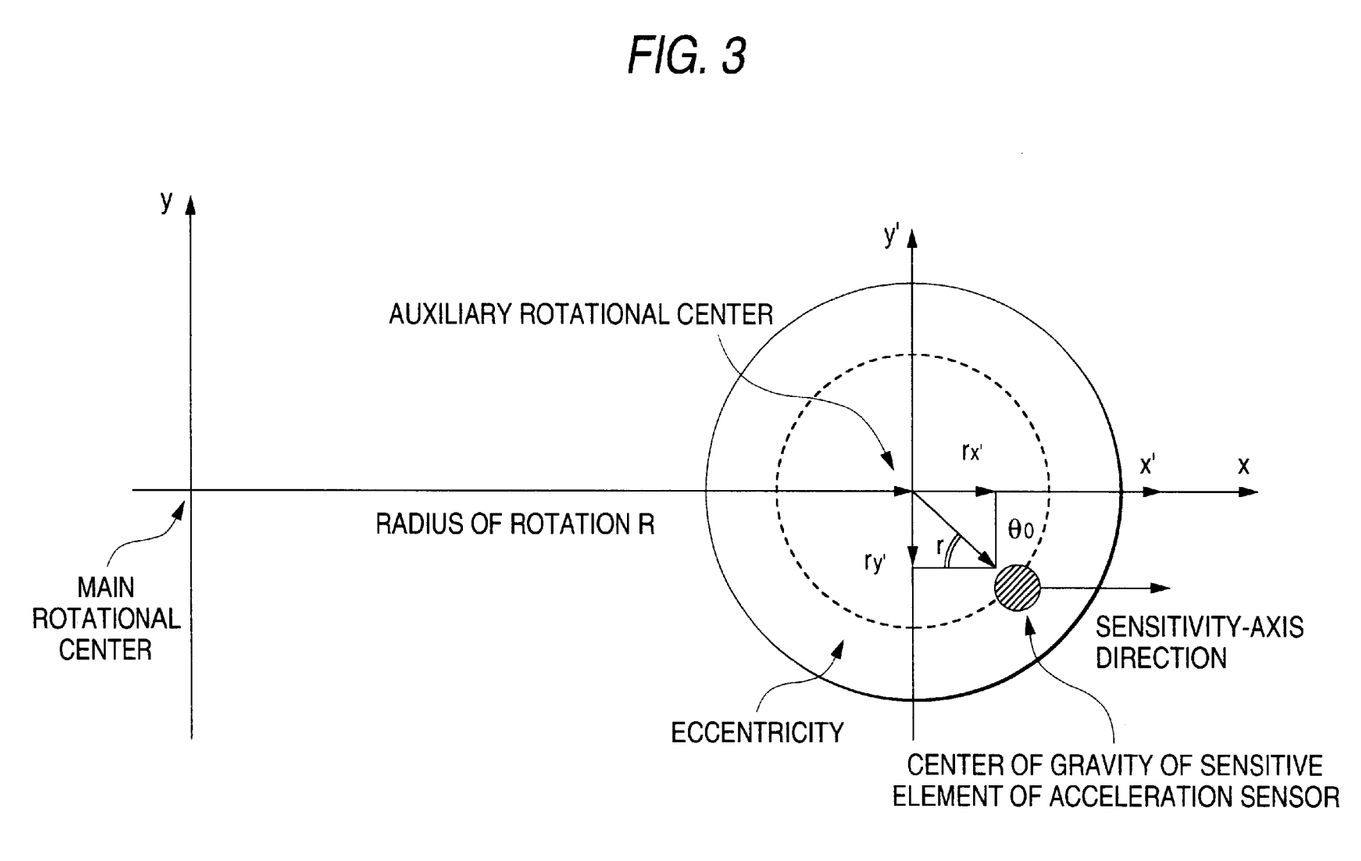
FIG. 3 is a plan view illustrating an eccentric state of the acceleration sensor.
Figure 4:
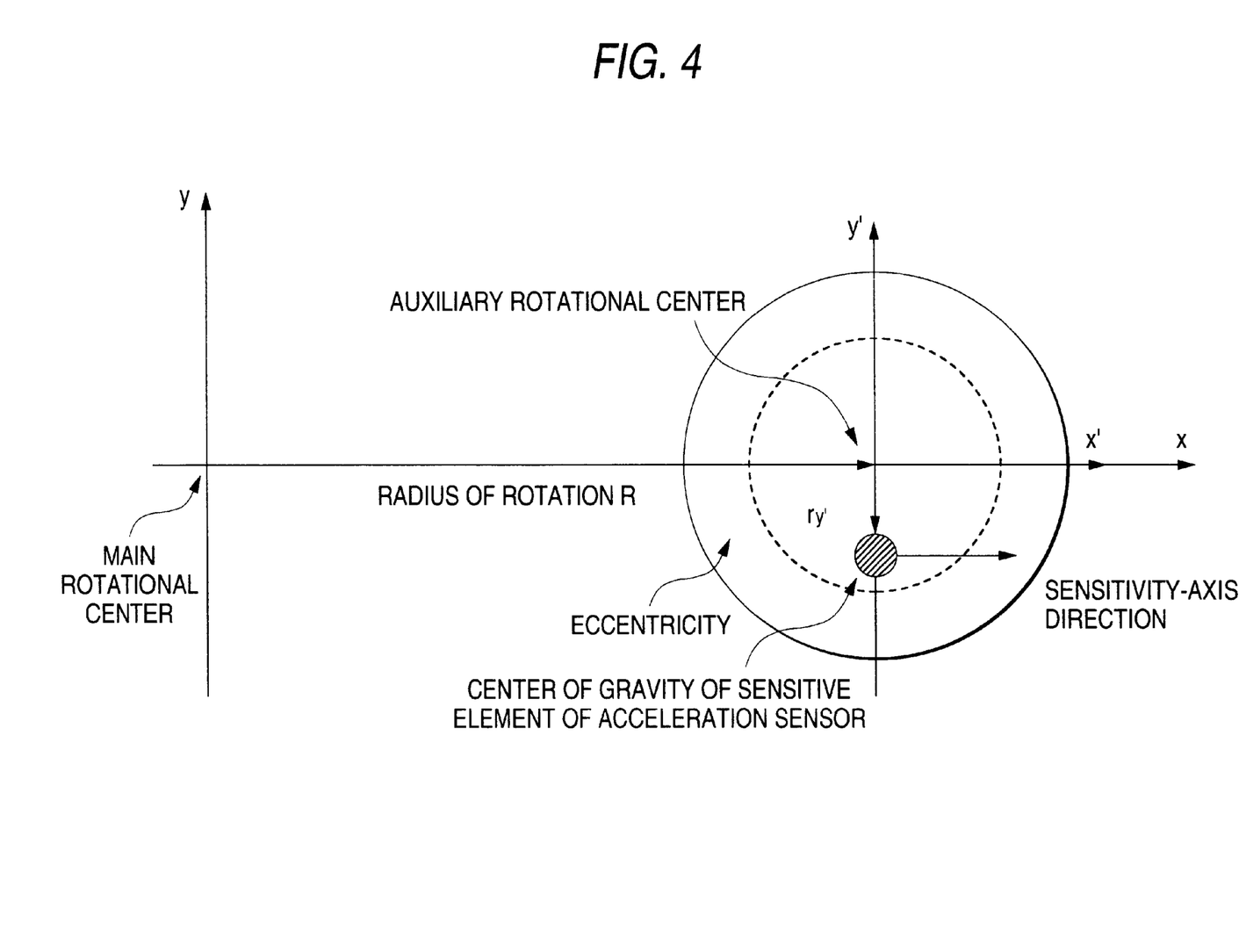
FIG. 4 is a plan view illustrating a state in which the acceleration sensor is off-centered only in the y'-axis direction.

Hereafter, a description will be given of the method of estimating an amount of eccentricity by referring to the drawings. FIG. 3 is a plan view illustrating an eccentric state of the acceleration sensor, and FIG. 4 is a plan view illustrating a state in which the acceleration sensor is off-centered only in the y'-axis direction. In these drawings, the x-y coordinate system and the x'-y' coordinate system correspond to the main turntable and the auxiliary turntable, respectively.

Conditions of Estimation (a) As shown in FIG. 3, it is assumed that although the position of the center of gravity of the sensitivity axis of the acceleration sensor is unknown, the direction of the sensitivity axis of the acceleration sensor and the direction of the x'-axis of the x'-y'coordinate of the auxiliary turntable are in alignment with each other. In addition, it is assumed that the main turntable is fixed such that the x-axis adjusting direction and the y-axis adjusting direction of the x-y table are in conformity with the x'-y'coordinate of the auxiliary turntable.

(b) The scale factor of the acceleration sensor has been determined with high accuracy.

(c) A uniaxial acceleration sensor is used as an object.

(d) It is assumed that the effect of the sensitivity of the other axis is nil.

A description will be given of the procedure of estimating the amount of eccentricity under the above-described conditions.

Since the estimation is effected by rotating only the auxiliary turntable, the main turntable is kept at a standstill.

(a) The amount of eccentricity in the x'-axis direction is determined.

First of all, the acceleration sensor is mounted on the auxiliary turntable, and the auxiliary turntable is rotated at a fixed frequency $f_0$ [Hz]. At this time, if the acceleration sensor output is positive, the center of gravity of the sensitivity axis of the acceleration sensor is off-centered on the right-hand plane of the y'-axis on the x'-y'coordinate. If the acceleration sensor output is negative, the center of gravity of the sensitivity axis of the acceleration sensor is off-centered on the left-hand plane of the y'-axis. If the acceleration sensor output is zero, the center of gravity of the sensitivity axis of the acceleration sensor is off-centered on the y'-axis.

Then, an acceleration sensor output ($a_{sm}$) at a time when the auxiliary turntable is being rotated at the fixed frequency $f_0$ [Hz] is measured.

Further, a sensitivity-axis-direction component ($a_s$) of the acceleration due to the centrifugal force in the x'-axis direction is given by the following:

[Equation 1]

$$a_s = (2\pi f_0)^2 r \cos \theta_0 \qquad (1)$$

Next, the vector r is resolved into components in the x'-axis direction and the y'-axis direction as follows (see FIG. 3).

[Equation 2]

$$\vec{r} = \vec{r}_{x'} + \vec{r}_{y'} \qquad (2)$$

Accordingly, Equation (1) becomes equal to an acceleration component acting in the vector r. Namely, the following equation (3) holds:

[Equation 3]

$$a_s = (2\pi f_0)^2 r \cos \theta_0 - (2\pi f_0)^2 r_{x'} \qquad (3)$$

From Equation (3), the amount of eccentricity in the x'-axis direction of the position of the center of gravity of the sensitivity axis of the acceleration sensor can be determined by using the aforementioned acceleration sensor output ($a_{sm}$) as follows:

[Equation 4]

$$r_{x'} = \frac{a'_{sm}}{(2\pi f_0)} \qquad (4)$$

The above calculation is performed by an controller (not shown) or calculator provided in a microcomputer.

(b) The position of the center of gravity of the sensitivity axis of the acceleration sensor is adjusted by manually or automatically moving the X-Y table provided on the auxiliary turntable in the X-axis direction by using the X-axis adjusting micrometer head such that the amount of eccentricity in the x'-axis direction determined in Equation (4) above becomes zero. The position of the center of gravity of the sensitivity axis after adjustment is assumed at the position shown in FIG. 4.

(c) Next, the amount of eccentricity in the y'-axis direction is determined.

The amount of eccentricity in the y'-axis direction is determined by using the tangential acceleration occurring due to the rotation of the auxiliary turntable.

The tangential acceleration occurring due to the rotation of the auxiliary turntable at the position of $r_{y'}$ is defined by the following equation:

[Equation 5]

$$a_r = 2\pi r_{y'} \frac{df}{dt} \qquad (5)$$

In a case where the auxiliary turntable is rotated at a constant angular velocity for a certain duration, Equation (5) can be expressed by the following equation:

[Equation 6]

$$a_r = 2\pi r_{y'} \frac{\Delta f}{\Delta t} \qquad (6)$$

Namely, (df/dt) in equation (5) is an amount of change ($\Delta f$) of the rotational frequency per fixed time ($\Delta t$).

By modifying Equation (6) and by using a measured value ($a_{Tm}$) of the tangential acceleration, the amount of eccentricity in the y'-axis direction is determined as follows:

[Equation 7]

$$r_{y'} = \frac{a_{Tm}}{2\pi\left(\frac{\Delta f}{\Delta t}\right)} \quad (7)$$

In a case where the rotating direction of the auxiliary turntable is counterclockwise, when the acceleration sensor output is positive, the center of gravity of the sensitivity axis of the acceleration sensor is off-centered on the y'-axis in the upper plane of the x'-axis on the x'-y' coordinate axes. Meanwhile, when the acceleration sensor output is negative, the center of gravity of the sensitivity axis of the acceleration sensor is off-centered on the y'-axis in the lower plane of the x'-axis. When the acceleration sensor output is zero, the center of gravity of the sensitivity axis of the acceleration sensor is set at the position of the rotational center of the auxiliary turntable. In addition, in a case where the rotating direction of the auxiliary turntable is clockwise, when the acceleration sensor output is positive, the center of gravity of the sensitivity axis of the acceleration sensor is off-centered in the lower plane of the x'-axis, whereas when the acceleration sensor output is negative, the center of gravity of the sensitivity axis of the acceleration sensor is off-centered in the upper plane of the x'-axis.

The above calculation of the amount of eccentricity in the y'-axis is performed by the controller (not shown) or calculator provided in the microcomputer.

The position of the center of gravity of the sensitivity axis of the acceleration sensor is adjusted by manually or automatically moving the X-Y table provided on the auxiliary turntable in the Y-axis direction by using the Y-axis adjusting micrometer head such that the amount of eccentricity in the y'-axis direction determined in Equation (7) becomes zero. This adjustment brings the center of gravity of the sensitivity axis of the acceleration sensor into alignment with the rotational center of the auxiliary turntable.

Preliminary Experiment

The validity of Equation (7) was verified.

As a sensor to be measured, a uniaxial acceleration sensor made by AKEBONO BRAKE INDUSTRY CO., LTD. (000RQ-AA-AKB, S/N 130) was used. The specifications of the sensor were as follows.

| Offset voltage | 2.519 [V] |
| Scale factor (+) | 1.679 [V/G] |
| Scale factor (−) | 1.671 [V/G] |

Figure 5:
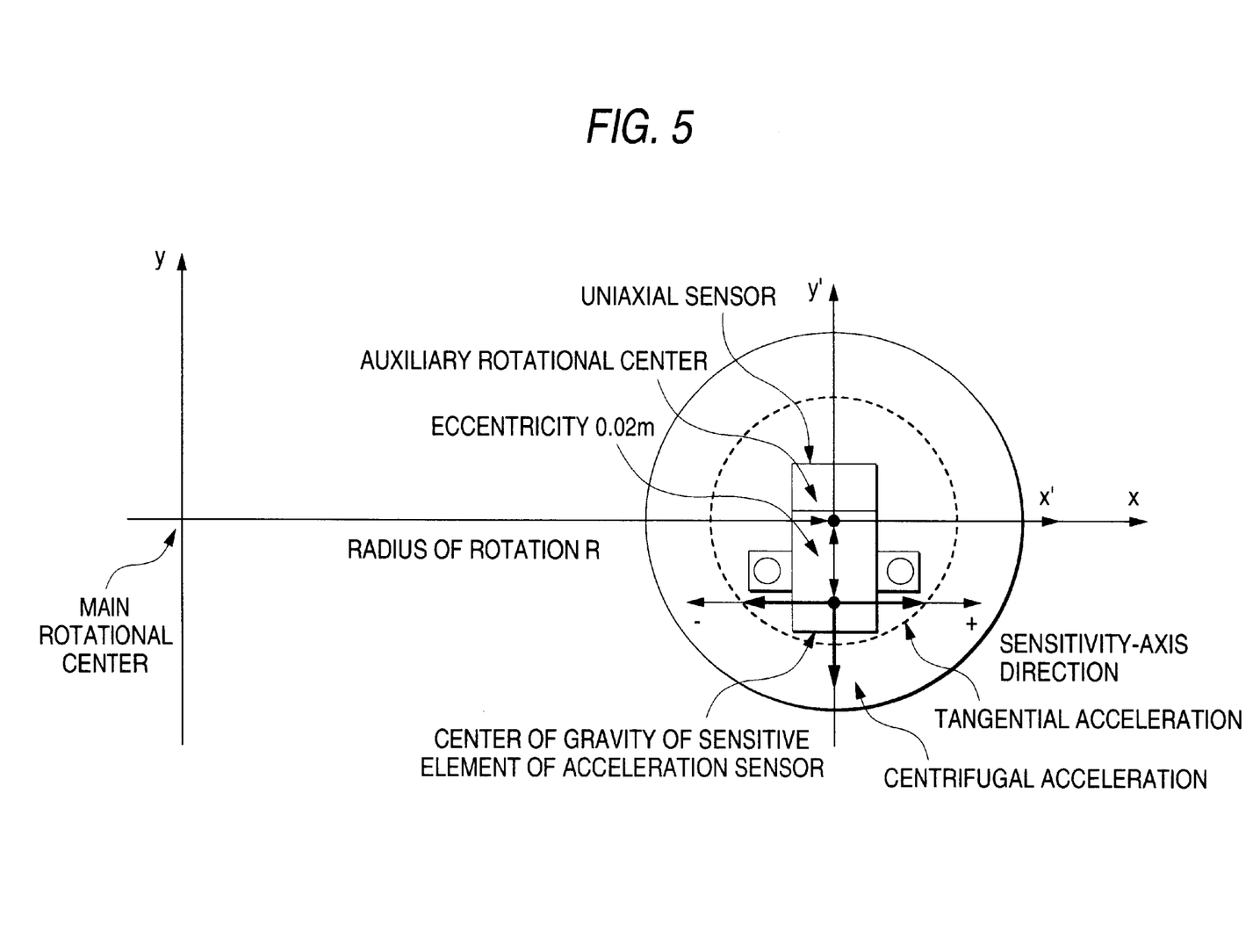
FIG. 5 is a installation diagram of the acceleration sensor on the auxiliary turntable.

An installation diagram of the acceleration sensor on the auxiliary turntable is shown in FIG. 5.

Amount of Eccentricity

Adjustment was carried out so that the center of gravity of the sensitivity axis was located at the position of 0.02 [m] in the -y'-axis direction, and the direction of the sensitivity axis was adjusted to agree with the x'-axis direction. Further, it was estimated that the setting error in the -y'-axis direction was ±0.001 [m] or thereabouts, that the deviation of the direction of the sensitivity axis of the acceleration sensor from the x'-axis direction was ±2 [deg] or thereabouts, and that the indeterminacy of the position of the center of gravity of the sensitivity axis within a sensor housing was located somewhere within a circle with a radius of rotation of not more than 0.001 [m] or thereabouts from the position in design.

Starting Time

As for the starting time of the auxiliary turntable, its servo motor driver was adjusted so that the auxiliary turntable was accelerated linearly in the range of 0 to 20 [Hz] for 0.5 [sec]. In addition, as for the rotating direction, the acceleration was rotated in two directions including the counterclockwise direction and the clockwise direction.

The aforementioned set value of the amount of eccentricity was for reducing as much as possible the indeterminacy of the position of the center of gravity of the sensitivity axis with respect to the amount of eccentricity. In addition, the set value of the starting time was set so that the tangential acceleration which was generated fell within the range of the uniaxial sensor.

Results of the Experiment

Figure 6:
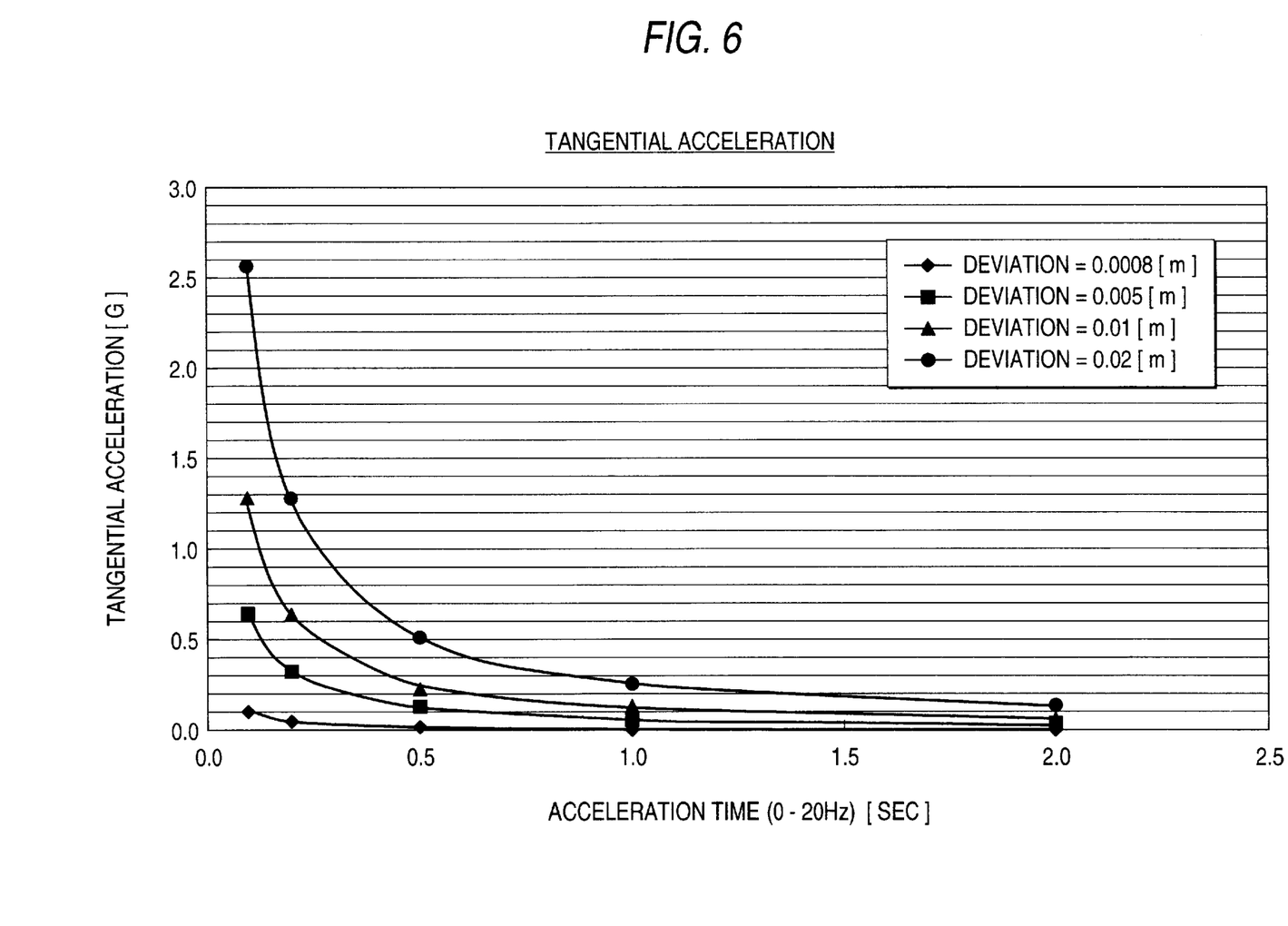
FIG. 6 is a diagram illustrating theoretical values of the tangential acceleration which was generated in a case where the center of gravity of the sensitivity axis of the acceleration sensor was off-centered only in the -y'-axis direction.

FIG. 6 shows the theoretical values of the tangential acceleration which was generated in the case where the center of gravity of the sensitivity axis of the acceleration sensor was off-centered only in the -y'-axis direction.

The tangential acceleration which was generated under the following experimental conditions is described below.

| Amount of eccentricity | 0.02 [m] |
| Starting time of the auxiliary turntable | 0.5 [sec] |
| Tangential acceleration | 0.5126 [G] |

Figure 7:
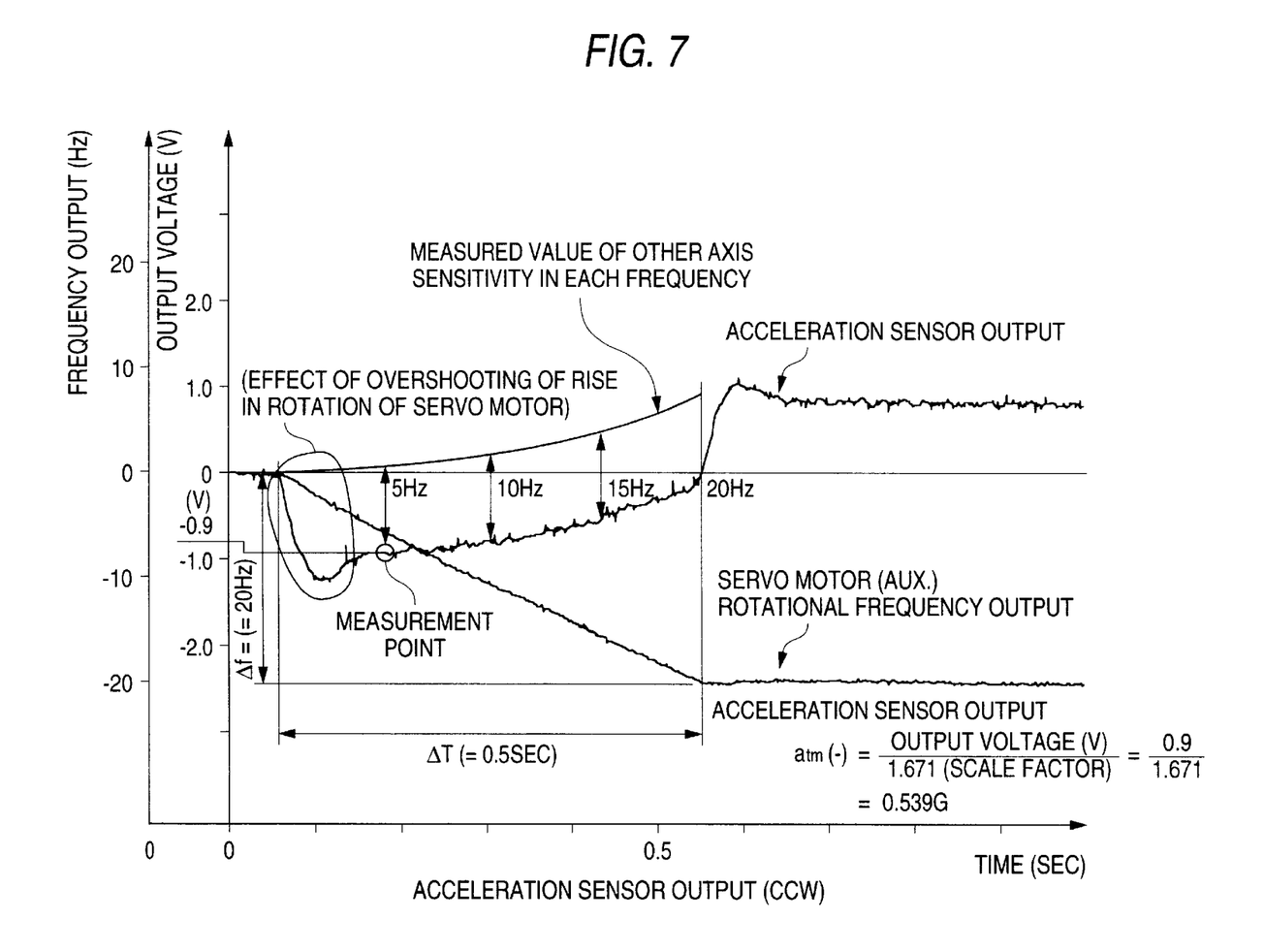
FIG. 7 is a graph illustrating the acceleration sensor output and the rotational frequency output of the auxiliary turntable in a cape where the rotating direction of the auxiliary turntable was counterclockwise.
Figure 8:
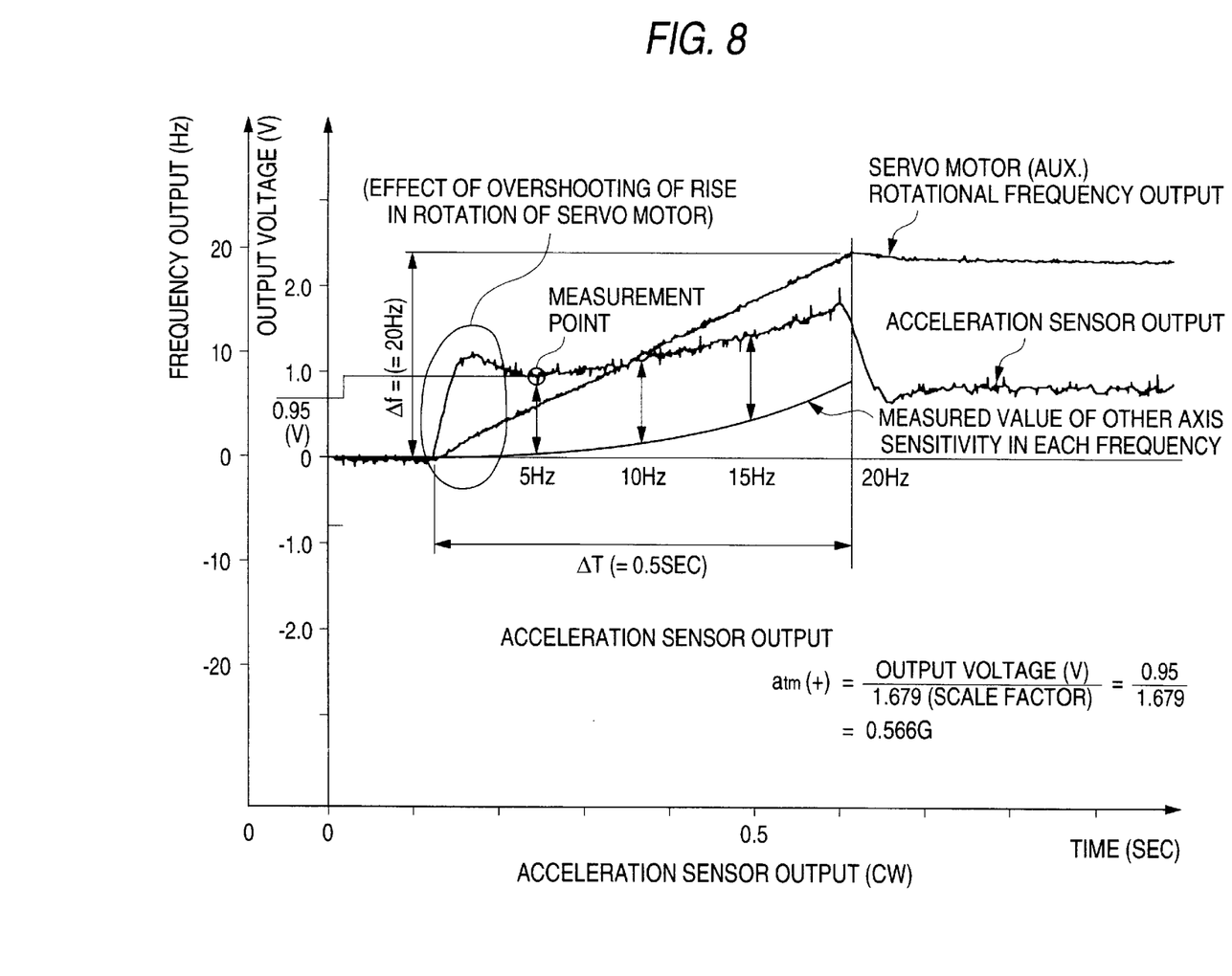
FIG. 8 is a graph illustrating the acceleration sensor output and the rotational frequency output of the auxiliary turntable in the case where the rotating direction of the auxiliary turntable was clockwise.

FIG. 7 is a graph illustrating the acceleration sensor output and the rotational frequency output of the auxiliary turntable in the case where the rotating direction of the auxiliary turntable was counterclockwise, while FIG. 8 is a graph illustrating those in the case where the rotating direction of the auxiliary turntable was clockwise. If the effects of the other axis sensitivity and the deviation of the sensitivity axis were at negligible levels, the acceleration sensor output during the acceleration of the auxiliary turntable would be a constant value. In practice, however, their effects are not at negligible levels, with the result that the acceleration sensor output also increased with an increase in the rotational frequency of the auxiliary turntable. Accordingly, the amount of eccentricity was calculated by using, as the measured values of the tangential acceleration, the acceleration sensor outputs in frequencies (4 to 5 [Hz] or thereabouts) at which the effects of the other axis sensitivity and the like were small and the effects of the overshooting of the rotational speed of the auxiliary turntable were nil. If the acceleration sensor outputs are determined from the graphs, the following results are obtained.

$$a_{Tm}(CW) = 0.566 \text{ G}$$

$$a_{Tm}(CCW) = -0.539 \text{ G}$$

From these values, the amount of eccentricity in the y'-axis direction is determined. From Equation (7),

[Equation 8]

$$r_{y'} = \frac{a_{Tm} \cdot g_s}{2\pi\left(\frac{\Delta f}{\Delta t}\right)} \qquad (8)$$

$$= \frac{a_{Tm}(CCW \text{ or } CW) \cdot 9.80665}{2\pi\left(\frac{20}{0.5}\right)}$$

where $g_s$=9.80665 m/s (standard value of gravitational acceleration. From Equation (8), we obtain $r_{y'}$(CW)=0.0221 [m]

$r_{y'}$(CCW)=0.0210 [m]

From the foregoing results, if consideration is given to the other axis sensitivity, the deviation in the sensitivity axis, and the fact that the center of gravity of the sensitivity axis of the acceleration sensor cannot be accurately disposed on the y'-axis, it can be thought that the validity of Equation (7) has been shown. In addition, although the difference of 0.001 [m] or thereabouts can be recognized in the estimated value due to the difference in the rotating direction, it is considered that this difference is within the range of the estimation error due to the fact that the estimated value was calculated by using an oscilloscope.

Although, in the above-described embodiment, a description has been given of the example in which the double turntable is used as the rotating body, the present invention is not necessarily limited to the turntable insofar as stable rotation can be obtained. Furthermore, the present invention is naturally applicable to a single turntable as well. In a single turntable embodiment, instead of mounting an acceleration sensor on an auxiliary rotating body as in a double turntable-type acceleration generating apparatus, an acceleration sensor is mounted on the one turntable of the single turntable-type acceleration generating apparatus.

As described above in detail, in accordance with the present invention, an outstanding advantage is offered in that even if the acceleration sensor is disposed with the center of gravity of the sensitivity axis off-centered at any position, the amount of eccentricity can be easily estimated. In addition, by adjusting the position of the center of gravity of the sensitivity axis of the acceleration sensor on the basis of the estimated amount of eccentricity, it is possible to align the center of gravity of the sensitivity axis of the acceleration sensor and the rotational center of the auxiliary turntable, so that the acceleration sensor characteristics can be always ascertained accurately.

What is claimed is:

1. A method of estimating an eccentric position of an acceleration sensor, in a double turntable-type acceleration generating apparatus including a main rotating body rotated by a first servo motor; and an auxiliary rotating body mounted on an outer periphery of the main rotating body, the auxiliary rotating body being rotatable by a second servo motor, on which the acceleration sensor is capable of being mounted, said method comprising the steps of:
(a) mounting the acceleration sensor on the auxiliary rotating body;
(b) rotating the auxiliary rotating body at a constant frequency with the main rotating body held at a standstill;
(c) measuring an output signal from the acceleration sensor during the step (b);
(d) determining an amount of eccentricity in an X-axis direction of the acceleration sensor from the frequency of the auxiliary rotating body and the output signal during the step (b); and
(e) determining an amount of eccentricity in a Y-axis direction by using tangential acceleration generated by the rotation of the auxiliary rotating body in a state in which the amount of eccentricity in the X-direction is set to substantially zero.

2. A double turntable-type acceleration generating apparatus, comprising:
a main rotating body rotated by a first servo motor;
an auxiliary rotating body mounted on an outer periphery of said main rotating body, said auxiliary rotating body being rotatable by a second servo motor, wherein an acceleration sensor is mountable thereon; and
an eccentricity adjuster including an X-Y table movable in an X-direction and a Y-direction and mounted on said auxiliary rotating body.

3. The double turntable-type acceleration generating apparatus according to claim 2, further comprising:
a first calculator for calculating an amount of eccentricity in X-axis direction of the acceleration sensor by measuring an output signal from the acceleration sensor during rotation of said auxiliary rotating body at a constant frequency with the main rotating body held at a standstill, wherein the amount of eccentricity in X-axis direction is determined from the frequency of said auxiliary rotating body and the output signal; and
a second calculator for calculating an amount of eccentricity in Y-axis direction of the acceleration sensor by using tangential acceleration generated by the rotation of said auxiliary rotating body in a state in which the amount of eccentricity in the X-axis direction is set to substantially zero,
wherein the X-Y table of said eccentricity adjuster is adjusted on the basis of outputs from said first calculator and said second calculator.

4. The double turntable-type acceleration generating apparatus according to claim 3,
wherein both an X-axis adjusting micrometer and a Y-axis adjusting micrometer are capable of being controlled both by the outputs from said first calculator and said second calculator and by hand.

5. The double turntable-type acceleration generating apparatus according to claim 2,
wherein the X-Y table of said eccentricity adjuster includes an X-axis adjusting micrometer and a Y-axis adjusting micrometer.

6. A single turntable-type acceleration generating apparatus, comprising:
a rotating body rotated by a servo motor, wherein an acceleration sensor is mountable thereon; and
an eccentricity adjuster including an X-Y table movable in an X-direction and a Y-direction and mounted on said rotating body.

* * * * *